July 4, 1933.   S. TAUBER ET AL   1,916,699
MEANS FOR STRINGING TENNIS RACKETS WITH STRINGS
Original Filed March 19, 1929   2 Sheets-Sheet 2
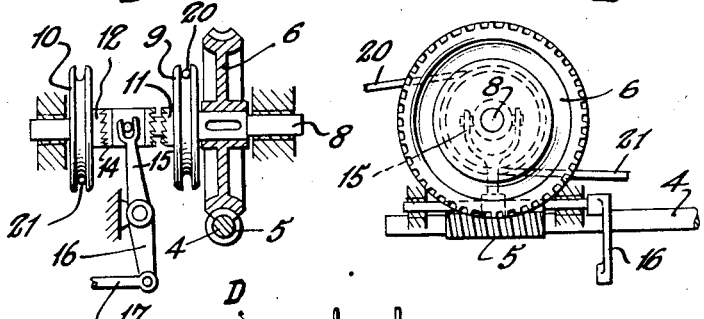
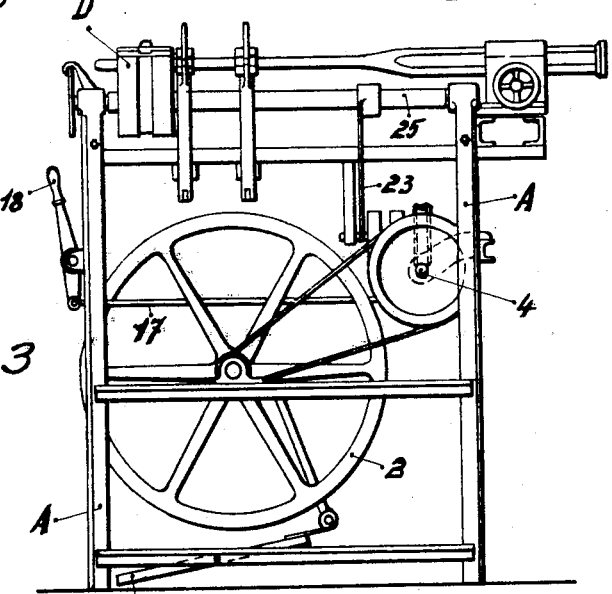
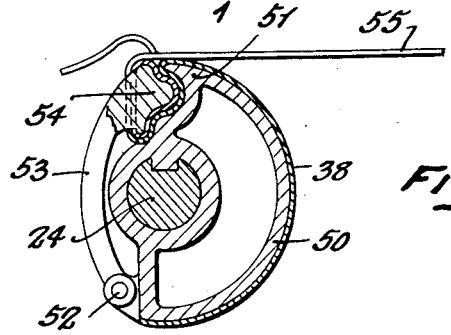
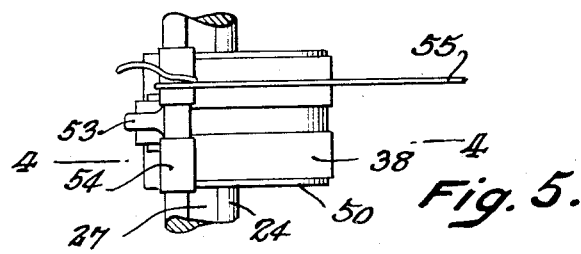
Siegfrid Tauber
Ladislaus Fischmann
INVENTORS
BY
ATTORNEY.

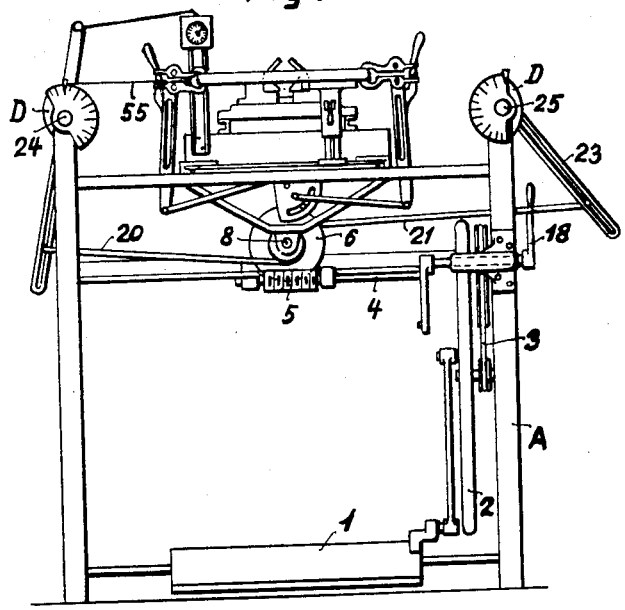
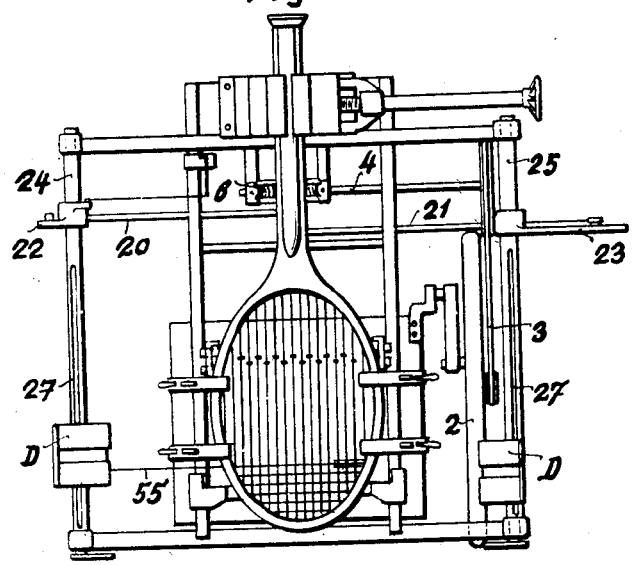

Patented July 4, 1933

1,916,699

UNITED STATES PATENT OFFICE

SIEGFRID TAUBER AND LADISLAUS FISCHMANN, OF VIENNA, AUSTRIA, ASSIGNORS, BY MESNE ASSIGNMENTS, TO DUNLOP RUBBER COMPANY LIMITED, OF LONDON, ENGLAND

MEANS FOR STRINGING TENNIS RACKETS WITH STRINGS

Original application filed March 19, 1929, Serial No. 348,328, and in Austria October 17, 1928. Divided and this application filed July 9, 1931. Serial No. 549,675.

This invention relates to improvements in means for stringing tennis rackets with strings and the present application is a divisional application of applicants' copending application filed March 19, 1929, Serial No. 348,328.

A constructional example of the means employed is shown in the accompanying drawings in which Fig. 1 is a front elevational view of the complete device;

Fig. 2 is a plan view thereof;

Fig. 3 is a side elevational view;

Fig. 4 is a substantially transverse sectional view of the clamping device for stretching the strings, the section being taken on the line IV—IV of Fig. 5;

Fig. 5 is a plan view of the clamping device of Fig. 4;

Fig. 6 is a front elevational view of the mechanism for operating the clamping device, and Fig. 7 shows the same in side elevation.

In the frame A is provided a pedal drive 1 with a fly-wheel 2 by which the shaft 4 is driven by a belt drive 3. On the shaft 4 is mounted a worm 5, which gears with the worm wheel 6 which is keyed on the shaft 8 mounted in bearings in the frame. On the shaft 8 are mounted two pulleys 9 and 10 which rotate freely thereon but are prevented from moving endways on the shaft. These two pulleys 9 and 10 may be coupled selectively to the shaft 8 by means of the jaw clutches 11, 12. The throwing into and out of operation of the clutches is effected by the sliding sleeve 14, the lever arms 15, 16, the connecting rod 17, and by the lever 18. The distance of the two pulleys 9 and 10 from each other is so selected that only one of the two pulleys 9 or 10 can be coupled at a time to the shaft 8. 20 and 21 are two tension cords, one end of each of which is attached to the periphery of the pulleys 9, 10 respectively, while the other ends of these two tension cords are connected to arms 22, 23 which operate the clamping devices D.

The arms 22, 23 are each provided with a longitudinal slot, in which the end of the corresponding tension cord can be securely clamped and the arms are rigidly connected to the shafts 24, 25 mounted in bearings in the frame. Each of these two shafts has a longitudinal groove 27 formed in it along which the clamping devices D for clamping the string can slide. The devices D each consist as shown in Figs. 4 and 5 of a hollow sheet-metal body 50 keyed on the shaft 24 or shaft 25 and adapted to be moved endways thereon. At 51 is formed a fluted rubber covered clamping jaw in the body 50. To this hollow body 50 is pivoted an arm 53 adapted to rock on the pin 52 and this arm forms the second clamping jaw 54. The string 55 coming from the racket frame is wrapped first round the clamping jaw 54 on its outer face and then passed between the clamping jaws 54 and 51. If now the shaft 24 be rocked the string 55 presses the clamping jaws together. It is thereby gripped and on further rotation of the shaft 24 the string is stretched. The hollow body 50 has a cylindrical outer surface 38 the diameter of which is such that the string lying at a tangent to the cylindrical surface runs in the working plane.

The operation is as follows:

If the pedal drive 1 be operated and the lever 15, 16 rocked to couple, say, the pulley 9 to the shaft 8, this pulley when it rotates will pull on the cord 20 and the shaft 24 and the hollow body 50 will be rocked by the arm 22, causing the string 55 to press the clamping jaws 51 and 54 together, so that the string 55 is gripped between the clamping jaws and fastened. On further rotation of the shaft 24 the string is stretched applying itself to the cylindrical outer surface 38. In consequence of the bearing of the string on the cylindrical surface 38 the pull on the string will always be exerted in the working plane. When the desired tension has been obtained the driving mechanism is stopped, the pull on the string ceases and the end of the string can now be drawn through holes bored in the frame of the racket to the other side and stretched in the same manner with the second clamping device.

What we claim is:

1. In a tennis racket stringing machine, the combination with oppositely arranged string clamping devices for tensioning the transverse racket strings, of a support for each device, actuating means for said clamping devices comprising a main driving shaft, pulleys operable from said driving shaft and cords connecting said pulleys with said supports, and means for selectively coupling said pulleys to said driving shaft to selectively operate said clamping devices.

2. In a tennis racket stringing machine, a string clamping device comprising a string supporting body, a shaft upon which said body is mounted, means for rotating said shaft in either direction and a clamping jaw pivotally supported on said body remote from the centre of the body and adapted to have a portion of a string wrapped thereabout, whereby when said shaft is rotated in one direction the string will be clamped by the jaw to said body and when the shaft is further rotated in the same direction the string will be tensioned while when said shaft is rotated in the opposite direction the clamping jaw and body will be separated to release the string.

3. In a tennis racket stringing machine, in combination, a plurality of string clamping devices each comprising a string supporting body, a shaft upon which said body is mounted, a clamping jaw pivotally supported on said body and adapted to have a portion of a string wrapped thereabout and cooperable with said body in tensioning said string, a pulley shaft, a pair of pulleys carried thereby, cords connecting the pulleys with the bodies carrying said jaws, means for selectively clutching the pulleys to the pulley shaft and means for rotating said pulley shaft in either direction, whereby when the body supporting shaft is rotated in one direction the string will be clamped by the jaw to said body and when the said body supporting shaft is further rotated in the same direction the string will be tensioned while when said body supporting shaft is rotated in the opposite direction the clamping jaw and body will be separated to release the string.

In testimony whereof we affix our signatures.

SIEGFRID TAUBER.
LADISLAUS FISCHMANN.